United States Patent

Reed et al.

[11] Patent Number: 5,115,638
[45] Date of Patent: May 26, 1992

[54] PROPULSION TURBINE FUEL CONTROL SYSTEM

[76] Inventors: Wendell E. Reed, 107 Murray St., Chula Vista, Calif. 92010; Malcolm J. McArthur, 13821 Davenport Ave., San Diego, Calif. 92129

[21] Appl. No.: 461,746

[22] Filed: Jan. 8, 1990

[51] Int. Cl.⁵ ................................. F02C 9/28
[52] U.S. Cl. ..................... 60/39.281; 60/734
[58] Field of Search ............ 60/39.281, 734, 744, 60/745

[56] References Cited

U.S. PATENT DOCUMENTS

| | | |
|---|---|---|
| 3,418,805 | 12/1968 | Barish et al. |
| 3,660,977 | 5/1972 | Reynolds |
| 3,695,037 | 10/1972 | Alverani .................. 60/39.281 |
| 3,908,360 | 9/1975 | Meyer ..................... 60/39.281 |
| 3,946,551 | 3/1976 | Linebrink et al. ......... 60/39.281 |
| 4,033,115 | 7/1977 | Baits |
| 4,922,708 | 5/1990 | Nelson ..................... 60/734 |

Primary Examiner—Louis J. Casaregola
Attorney, Agent, or Firm—Antonelli, Terry, Stout & Kraus

[57] ABSTRACT

A fuel control system for a small gas turbine propulsion engine which enables a long term storage with fuel combined with a rapid start and operation as well as rapid stable control of the fuel flow. The control system includes an electrically controlled servo valve disposed upstream of a fuel pump, with the valve and pressure sensing cavities of a differential pressure control device being maintained full of fuel for a long term storage. Leakproof-type flexure pivots are provided for transmitting motion of an electrical torque motor to the servo valve and transmitting motion of a diaphragm to a throttle located downstream of the fuel pump. A frangible diaphragm is provided at the pump inlet which is adapted to be fractured or otherwise opened to activate the system upon a start-up of the turbine engine and, for this purpose, pressurized gas may be used to temporarily pressurize a fuel tank to burst the frangible diaphragm. The fuel flow is proportional to an applied electric current and independent of the tank or engine pressures, with the electric current being controlled by an electronic controller.

32 Claims, 2 Drawing Sheets

PROPULSION TURBINE FUEL CONTROL SYSTEM

TECHNICAL FIELD

The present invention relates to a control system and, more particularly, to a fuel control system for propulsion turbine fuel control which enables a long term fuel storage and insures a rapid start in operation of the propulsion turbine.

BACKGROUND ART

Fuel control systems for turbines have been proposed in, for example, U.S. Pat. Nos. 3,418,805, 3,660,977, and 4,033,115; however, none of the proposed fuel control systems provide effective long term storage of the fuel in the fuel control system, rapid start and operation of the turbine, and modulated fuel flow to the turbine, all of which are factors of extreme importance in, for example, emergency hydraulic power systems for aircraft While proposed gas turbine engine control systems employ, for example, servo valves and fuel pressure differential valves, a disadvantage of the proposed control systems generally resides in the location of the servo valve in the control system, and ineffective means for insuring a proportional fuel flow to the gas turbine engine independent of the pressure of the fuel tank or turbine engine pressures.

In, for example, emergency hydraulic power systems for aircraft, it may develop that the small gas turbine propulsion units for the emergency hydraulic power systems may either be stored for a long period of time, for example, up to ten years, or use of the propulsion units may not be required for a considerable length of time; however, as can be readily appreciated, when the propulsion units are necessary, it is extremely essential that the fuel control system rapidly becomes effective with a modulated fuel flow so as to insure a proper operation of the propulsion unit.

DISCLOSURE OF THE INVENTION

The present invention provides a fuel control system which avoids the shortcomings and disadvantage encountered in prior art fuel control systems for gas turbine propulsion units by providing a simple electromechanical control for insuring the maintenance of a constant differential pressure across the servo-valve of the fuel control system so that a rapid start, ignition, and fuel supply is readily obtainable upon demand.

In accordance with advantageous features of the present invention, an electrically controlled servo-valve is provided and disposed forwardly of a centrifugal fuel pump, wherein the valve and pressure sensing cavities of a differential pressure control device can be maintained full of fuel for a long term storage.

To insure the long term storage while also insuring a rapid start in operation of the fuel control system, according to the present invention, leakproof flexure pivot means are provided for transmitting motion of a driver means such as, for example, an electrical torque or force motor to the electrically controlled servo-valve and for transmitting motion of a metallic pressure differential diaphragm to a throttle means located downstream of the fuel pump. A frangible diaphragm or other suitable containment means is disposed at an inlet of the fuel pump, with the diaphragm or other containment means being fractured or otherwise opened to activate the fuel control system for a start of the gas turbine engine.

Advantageously, according to the present invention, in order to burst or otherwise open the diaphragm or other containment means, a pressurized gas source may be provided for at least temporarily pressurizing the fuel tank whereby a pulsed pressure is generated in the fuel line leading to the inlet of the fuel pump to fracture or open the diaphragm or other containment means.

Advantageously, a suitable orifice means or the like is in communication with the fuel tank during storage of the fuel system so as to maintain the pressure acting on a bladder o bellows of the fuel tank at an atmospheric pressure. During a start-up of the fuel control system, a suitable relief valve means is provided for preventing gas pressure from the pressurized gas source from exceeding a predetermined set limit.

Subsequent to a start-up of the fuel control system, in accordance with further features of the present invention, discharge pressure from a compressor of the gas turbine propulsion unit is communicated through a check valve means to a gas side of the bladder in the fuel tank so that the fuel tank pressure is not allowed to drop below a pressure in a combustor of the gas turbine propulsion unit thereby advantageously minimizing pressure rise or increase requirements for the fuel pump of the fuel system, which fuel pump is preferably a centrifugal fuel pump adapted to be rotated at a substantially high rotational speed by a direct drive off the turbine of the gas turbine propulsion unit.

By virtue of the features of the present invention, a fuel control is provided which provides fuel flow which is a function of a pressure differential across an area of an orifice controlled by the servo valve. The area of the servo valve orifice is linearly proportional to the electric current supplied to the servo-valve coil. This then results in a fuel flow which is linearly proportional to the current supplied to the servo-valve coil.

In accordance with the present invention, the diaphragm of the servo-valve means moves to position the throttle valve so as to regulate the pressure drop across the servo-orifice so as to be approximately constant at about 10 psi or less. A closing of the throttle reduces the flow by increasing the head rise of the pump thereby restoring the pressure differential across the servo-valve to a value that just balances the force of a spring opposing the pressure differential diaphragm, that is, to a fixed value. In this manner, the flow becomes proportional to the applied electric current and independent of the tank or engine pressures.

Advantageously, according to the present invention, the electric current supply to the driver means may be controlled by a suitable conventional electronic controller responsive to a conventional algorithm for controlling the speed, acceleration, and deceleration of the gas turbine engine.

Accordingly, it is an object of the present invention to provide a fuel control system which is capable of being sealed for long-term storage and which has a minimum fill volume for enabling a quick start of a gas turbine engine of a propulsion unit.

Yet another object of the present invention resides in providing a controlled system having a pressure differential valve which maintains a constant differential pressure across the servo by throttling an outlet of the fuel pump.

A further object of the present invention resides in providing a fuel control system for a gas turbine engine of a propulsion unit which enables a simple electro-mechanical control utilizing only one controlled parameter, namely a servo current, and in which a fuel flow initiation, start, and ignition of the gas turbine engine can be accomplished by a single discrete command in response to only two sensed parameters such as, for example, engine speed and compressor inlet temperature.

A still further object of the present invention resides in providing a highly reliable fuel control system utilizing no sliding parts and employing flexure pivots and metallic diaphragms thereby enhancing the long term storage capabilities of the fuel control system.

The above and other objects, features, and advantages of the present invention will become more apparent from the following description when taken in connection with the accompanying drawings which show, for the purpose of illustration only, several embodiments in accordance with the present invention.

BEST MODE FOR CARRYING OUT THE INVENTION

Figure 1:
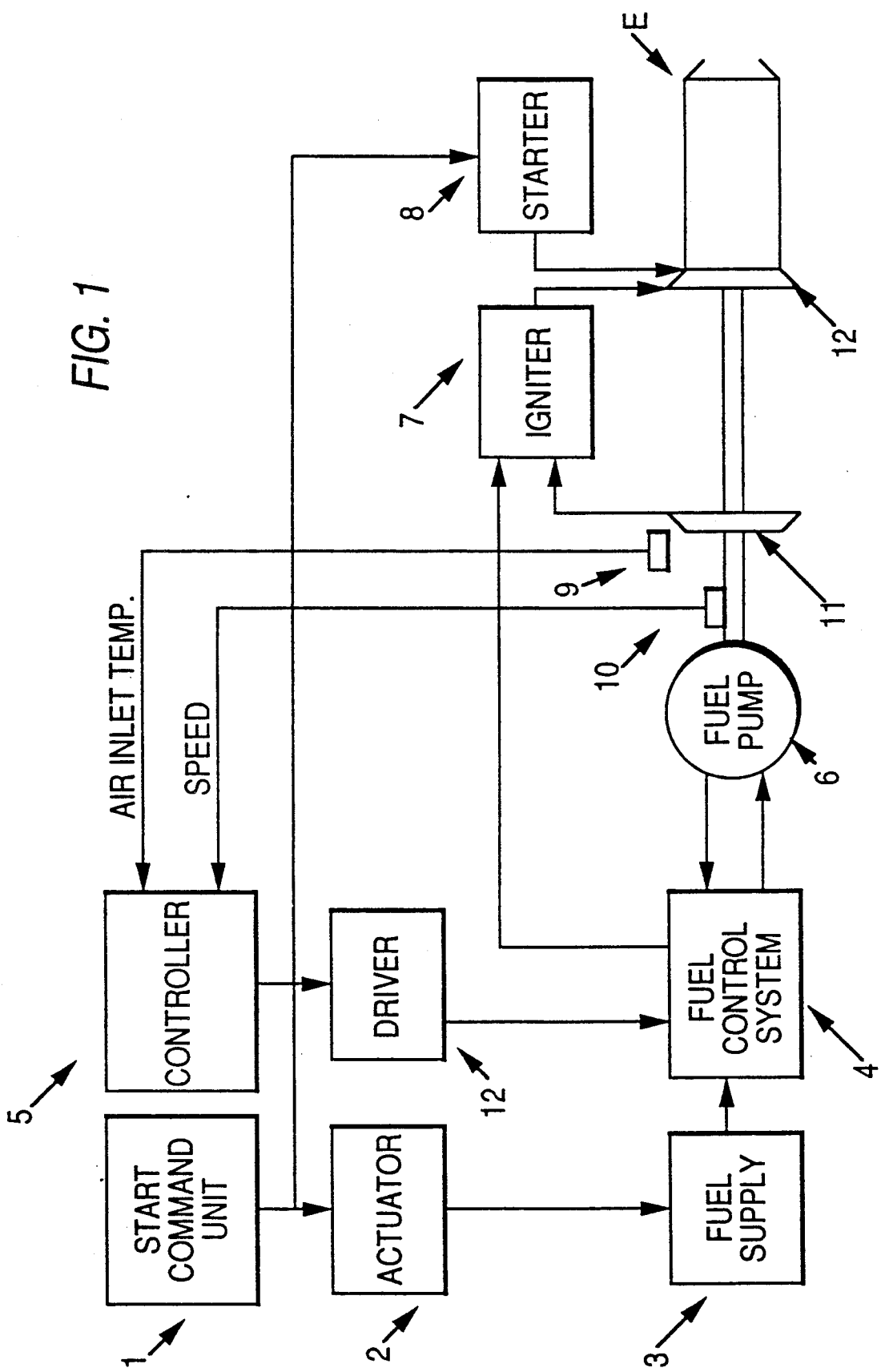
FIG. 1 is a schematic view of an overall control system for a gas turbine engine for an aircraft propulsion unit.

Referring now to the drawings wherein like reference numerals are used throughout the various views to designate like parts and, more particularly, to FIG. 1, according to this figure, a control system for a gas turbine engine of an aircraft propulsion unit includes a start command unit generally designated by the reference numeral 1 for providing a start command signal to an actuator means generally designated by the reference numeral 2 providing, for example, a pressure pulse to a fuel supply generally designated by the reference numeral 3 for causing a fuel feed by way of a centrifugal fuel pump generally designated by the reference numeral 6 directly shaft driven by a turbine generally designated by the reference numeral 12 of a gas turbine engine generally designated by the reference character E so as to supply fuel to a combustor generally designated by the reference numeral 7 of the gas turbine engine E. The fuel control system receives a servo-current from a conventional controller means generally designated by the reference numeral 5 through a conventional driver means generally designated by the reference numeral 12. The controller means is responsive to, for example, a demand signal, altitude pressure, compressor air inlet temperature and compressor speed, with the air inlet temperature and rotational speed of the compressor being sensed by, for example, conventional sensors generally designated by the reference numerals 9 and 10.

Figure 2:
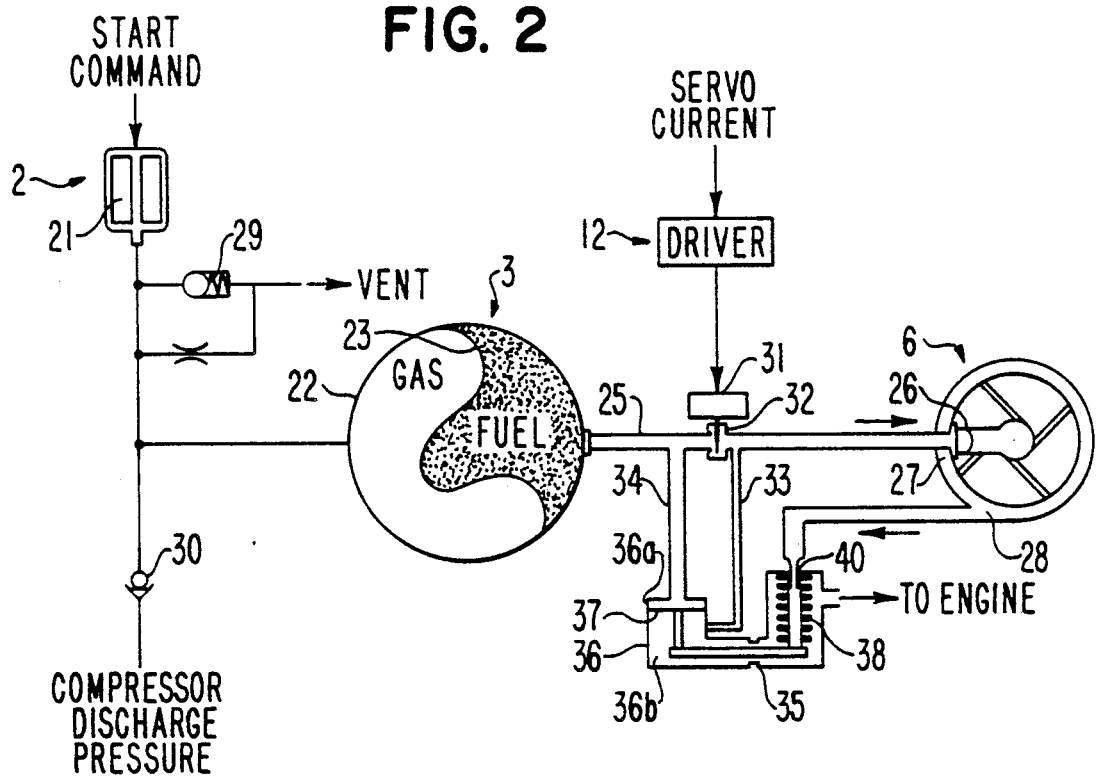
FIG. 2 is a schematic view of a fuel control system constructed in accordance with the present invention.

As shown most clearly in FIG. 2, the actuator means 2 may include, for example, one or more gas cylinder means 21 communicating with a fuel tank 22 of the fuel supply system 3, with the fuel tank 22 including a displaceable member, such as, for example, a bladder 23, separating a gas from fuel contained in the fuel tank 22. An orifice means 24 permits a gas side of the bladder 23 of the fuel tank 22 to remain at atmospheric pressure during storage of the fuel control system 4. Supplying a start command signal to the actuator means 2 results in the gas cylinder means 21 being actuated so that compressed gas is released under pressure so as to maintain a tank pressure of about 100 psi for a period of 4–5 seconds, with the compressed gas acting upon the bladder 23 to initiate a flow of fuel from the fuel tank 22.

The fuel tank 22 communicates by way of, for example, fuel line means 25 with the vaned centrifugal fuel pump 6. The fuel line means 25 communicates with a fuel inlet port 27 of the fuel pump 6, with a frangible containment device 26 such as, for example, a disk or diaphragm, being interposed between the fuel line means 25 and the fuel inlet port 27. Prior to activation of the actuator device 2, the fuel supply 3 and fuel control system 4 form a contained system with the fuel filling the system from the fuel tank 23 to the fuel inlet port 27 of the fuel pump 6. Upon a pressure pulse being supplied by the gas cylinder means 22, the pressurizing of the fuel tank 23 to maintain the pressure of the fuel tank 23 at about 100 psi for 4 or 5 seconds results in a sufficient pressure being generated to rupture the frangible containment device 26 and activate the fuel control system 4 for a start operation of the gas turbine engine E. The start command unit 1 supplying the start command signal to the actuator 2 also functions to provide a start command signal to the starter generally designated by the reference numeral 8 for the gas turbine engine E. A relief valve 29 prevents the gas pressure from exceeding a preset limit, and to insure that the gas side of the bladder 23 of the fuel tank 22 does not drop below a pressure of the combustor turbine engine E, a discharge pressure from the compressor 11 is supplied to the fuel tank 22 by way of a check valve 30. A suitable fuel screen or filter arrangement (not shown) may be provided in an area of the frangible containment device 26 or form a portion thereof and serve as a filter for minimizing if not preventing a flow of dirt or other contaminants in the fuel to the fuel pump 6.

The fuel control system 4 further includes a servo-valve means 31 interposed between the fuel tank 22 and the fuel inlet port 27 of the fuel pump 6. The servo valve means 31, forming a variable flow control means, is responsive to the driver 12, in the form of, for example, a force or torque motor, and controls, by way of a flexure pivot means 32, a size of a servo-orifice interposed in a fuel pressure control loop including fuel line means 33, 34 respectively communicating with the fuel line means 25 at positions downstream and upstream of the servo valve means 31, as viewed in a normal flow direction of the fuel. The diaphragm 37 is disposed in a housing 36 or the like and divides the same into two fuel accommodating chambers or cavities 36a, 36b, with a position of the diaphragm 37 being controlled through a flexure pivot means 35.

A throttle valve means 40 is interposed between a fuel outlet port 28 of the fuel pump 6 and an injector (not shown) of a combustor (not shown) of the turbine engine E. The throttle valve means 40 is positionable in response to movements of the diaphragm 37 by way of the flexure pivot means 35.

In operation, a fuel flow to the engine E is controlled by varying the electric current to the torque motor or driver 12, which moves to produce a servo valve opening of the servo-orifice approximately proportional to the applied current. The diaphragm 37 moves to position the throttle valve 40 so as to regulate the pressure drop across the servo-orifice so as to maintain the same approximately constant at 10 psi or less. A closing of the throttle valve 40 reduces the flow by increasing the head rise at the fuel pump 6 and this, in turn, will restore the pressure differential across the servo valve means 31 to a value that balances a force of a spring 38 opposing a movement of the diaphragm 37, i.e., a fixed value. In this manner, a fuel flow becomes proportional to the applied electric current and is independent of the pressure of the fuel tank 22 or pressure of the engine E. The electric current is controlled, in a conventional manner, by the controller 5 by way of a conventional algorithm for controlling, for example, engine speed, acceleration, and deceleration.

By virtue of the features of the present invention, it is possible to provide a fuel control system which is full of fuel and may yet be stored for long periods of time without any concern for purging of the fuel line nor developing of corrosion problems, and which nevertheless provides a rapid response time and more sensitive control.

Moreover, the present invention provides a small pressure drop across the servo valve means 31 which is extremely important when the gas ullage increases. If the pressure differential across the servo valve means 31 is too great then the fuel delivery rate will fall below the necessary fuel delivery rate for the proper operation of the gas turbine engine E, and a large pressure drop across the servo valve means 31 will drop the head of the fuel pump 6 to thereby cause cavitation.

Accordingly, the present invention provides a fuel control system wherein the controlled fuel flow is a function of the pressure differential across an area of an orifice controlled by the servo valve. The area of the servo valve orifice is linearly proportional to the electric current supplied to the servo valve coil. This then results in a fuel flow which is linearly proportional to the current supplied to the servo valve coil.

While it may be a possible alternative to eliminate the centrifugal pump 6, its elimination would result in a larger pressurized gas volume being required in order to complete the mission time.

Figure 3:
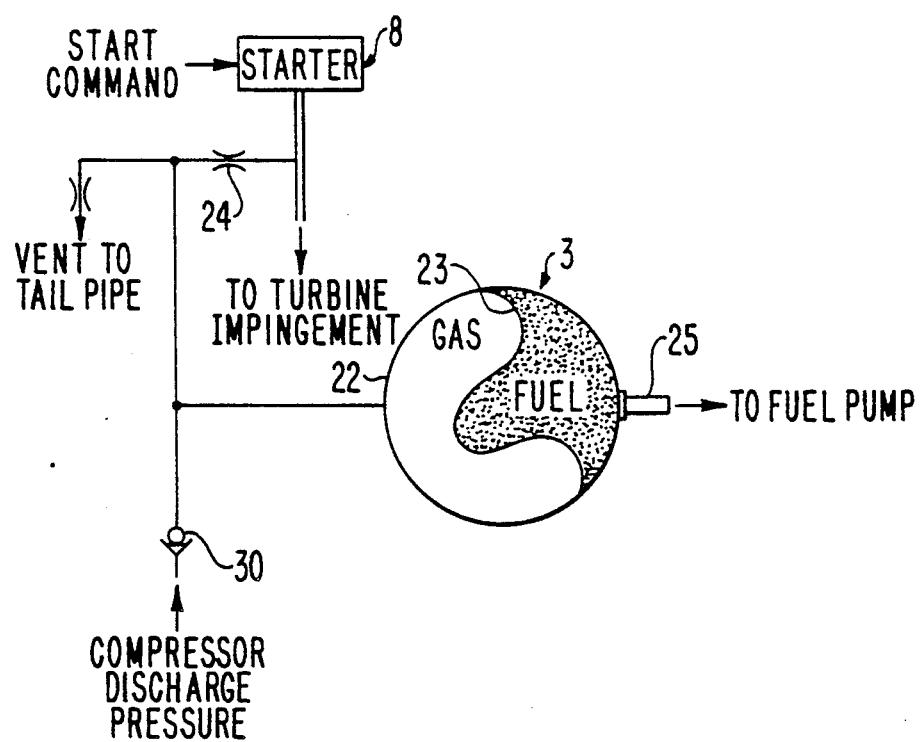
FIG. 3 is a partial schematic view of an alternative actuator or initiator arrangement for a fuel control system constructed in accordance with the present invention.

As shown in FIG. 3, it is possible to dispense with the relief valve 29 for preventing the gas pressure from exceeding the preset limit and simply provide a throttled vent line thereby further simplifying the control system of the present invention. However, in all other respects, the embodiment of FIG. 3 corresponds to the embodiment described in connection with FIG. 2.

While we have shown and described several embodiments in accordance with the present invention, it is understood that the same is not limited thereto but is susceptible to numerous changes and modifications as known to one of ordinary skill in the art and we therefore do not wish to be limited to the details shown and described herein, but intend to cover all such modifications as are encompassed by the scope of the appended claims.

We claim:

1. A fuel control system, the fuel control system comprising:

fuel storage means for accommodating a fuel to be supplied to the turbine engine including a pressurized fuel tank accommodating a quantity of fuel and a gas;

fuel pump means adapted to supply fuel from the fuel storage means to the turbine engine;

control means interposed between the fuel storage means and the fuel pump means for enabling and maintaining of a flow of fuel to the turbine engine at a pressure independent of a pressure in the fuel storage means and in the turbine engine in response to operating parameters of the engine including servo-valve means disposed in a fuel line means at a position upstream of the fuel pump means for controlling an opening and closing of a servo-orifice means; means for operating said servo-valve means in response to the operating parameters of the engine;

means for preventing a flow of fuel from the pressurized fuel tank to the fuel pump means until required by the turbine engine, thereby enabling a fuel storage in the fuel tank and fuel line means for subsequent start-up of the turbine engine including a frangible means disposed at an inlet of the fuel pump means; and means for at least temporarily providing a pressure pulse to the fuel tank means sufficient to rupture the frangible means to permit fuel flow to the fuel pump means in response to a start-up of the turbine engine.

2. A fuel control system according to claim 1, wherein said means for at least temporarily providing a pressure pulse includes an auxiliary pressure source means actuated in response to an engine start command.

3. A fuel control system according to claim 2, wherein said means for operating the servo valve means includes an electrically operated driver means for positioning the servo valve means in such a manner that a fuel flow through the servo-valve means is substantially proportional to an applied electric current to the driver means.

4. A fuel control system according to claim 3, wherein a controller is provided for controlling an operation of the driver means, and wherein the operating parameters include air inlet temperature and rotational speed of a compressor means of the turbine engine.

5. A fuel control system according to claim 4, wherein means are provided for regulating a pressure drop across the servo orifice means.

6. A fuel control system according to claim 5, wherein said means for regulating a pressure drop includes means communicating with the fuel line means upstream and downstream of the servo valve means, diaphragm means interposed in the means for communicating, and throttle means disposed downstream of the fuel pump means and operatively connected with the diaphragm means for enabling a positioning of the throttle means by the diaphragm so as to regulate the pressure drop across the servo orifice means.

7. A fuel control system according to claim 6, wherein a flexure pivot means is provided for connecting the diaphragm means and the throttle means.

8. A fuel control system according to claim 7, wherein means communicating with the fuel tank and an auxiliary pressure source means are provided for preventing an excess pressure from being supplied by the auxiliary pressure source means.

9. A fuel control system according to claim 8, wherein means are provided for maintaining a pressure in the fuel tank at least equal to a pressure of a combustor means of the gas turbine engine.

10. A fuel control system the fuel control system comprising:

fuel storage means for accommodating a fuel to be supplied to the turbine engine;

fuel pump means adapted to supply fuel from the fuel storage means to the turbine engine;

control means interposed between the fuel storage means and the fuel pump means for enabling and maintaining of a flow of fuel to the turbine engine at a pressure independent of a pressure in the fuel storage means and in the turbine engine in response to operating parameters of the engine; and means for preventing a flow of fuel from the fuel storage means to the fuel pump means until required by the turbine engine thereby enabling the formation of a closed fuel system activatable upon a start-up of the turbine engine including a frangible member arranged at an inlet of the fuel pump means adapted to be ruptured in response to a start command for a start-up of the turbine engine.

11. A fuel control system according to claim 10, wherein the control means includes a servo valve means interposed between the fuel storage means and fuel pump means for controlling an opening and closing of a servo orifice means in response to the operating parameters of the turbine engine.

12. A fuel control system according to claim 11, wherein electrically operated driver means are provided for positioning the servo valve means in such a manner that a fuel flow through the servo valve means is substantially proportional to an applied electric current to the driver means.

13. A fuel control system according to claim 12, wherein the driver means includes a torque motor means operative in response to signal supplied by a controller means.

14. A fuel control system according to claim 13, wherein means are provided for regulating a pressure drop across the servo orifice means so as to provide a substantially constant pressure.

15. A fuel control system according to claim 14, wherein said means for regulating includes means communicating with the fuel line means upstream and downstream of the servo valve means, diaphragm means interposed in the means for communicating, and throttle means disposed downstream of the fuel pump means and operatively connected with the diaphragm means for enabling a positioning of the throttle means by the diaphragm means so as to regulate the pressure drop across the servo orifice means.

16. A fuel control system according to claim 15, wherein a flexure pivot means is provided for connecting the diaphragm means and the throttle means.

17. A fuel control system according to claim 16, wherein means communicating with the fuel tank and an auxiliary pressure source means are provided for preventing an excess pressure from being supplied by the auxiliary pressure source means.

18. A fuel control system according to claim 17, wherein means are provided for maintaining a pressure in the fuel tank at least equal to a pressure of a combustor means of the gas turbine engine.

19. A fuel control system for a turbine engine, the fuel control system comprising:

fuel storage means for accommodating a fuel to be supplied to the turbine engine including a pressurized fuel tank accommodating a quantity of fuel and a gas;

fuel pump means adapted to supply fuel from the fuel storage means to the turbine engine;

control means interposed between the fuel storage means and the fuel pump means for enabling and maintaining of a flow of fuel to the turbine engine at a pressure independent of a pressure in the fuel storage means and in the turbine engine in response to operating parameters of the engine;

means for preventing a flow of fuel from the pressurized fuel tank to the fuel pump means until required by the turbine engine, thereby enabling a fuel storage in the fuel tank and fuel line means for subsequent start-up of the turbine engine including a frangible means disposed at an inlet of the fuel pump means; and means for at least temporarily providing a pressure pulse to the fuel tank means sufficient to rupture the frangible means to permit fuel flow to the fuel pump means in response to a start-up of the turbine engine.

20. A fuel control system according to claim 19, wherein said means for at least temporarily providing a pressure pulse includes an auxiliary pressure source means actuated in response to an engine start command.

21. A fuel control system for a turbine engine, the fuel control system comprising:

fuel storage means for accommodating a fuel to be supplied to the turbine engine;

fuel pump means adapted to supply fuel from the fuel storage means to the turbine engine;

control means interposed between the fuel storage means and the fuel pump means for enabling and maintaining of a flow of fuel to the turbine engine at a pressure independent of a pressure in the fuel storage means and in the turbine engine in response to operating parameters of the engine including servo orifice means disposed in a fuel line means upstream of the fuel pump means;

means for controlling an opening and closing of the servo-orifice means; and means for regulating a pressure drop across said servo orifice means so as to provide a substantially constant pressure.

22. A fuel control system according to claim 21, wherein said means for controlling an opening and closing includes a servo valve means operable by an electrically controlled driver means whereby fuel flow to the turbine engine is controlled by varying an electric current to the driver means.

23. A fuel control system according to claim 22, wherein said means for regulating includes means for communicating with the fuel line means upstream and downstream of the servo valve means, a diaphragm means interposed in the means for communicating, and a throttle means disposed downstream of the fuel pump means and operatively connected with the diaphragm means for enabling a positioning of the throttle means by the diaphragm means so as to regulate the pressure drop across the servo orifice means.

24. A fuel control system according to claim 23, a flexure pivot means is provided for connecting the diaphragm means and the throttle means.

25. A fuel control system for a turbine engine, the fuel control system comprising:

fuel storage means for accommodating a fuel to be supplied to the turbine engine including a pressurized fuel tank accommodating a quantity of fuel and a gas;

fuel pump means adapted to supply fuel from the fuel storage means to the turbine engine;

control means interposed between the fuel storage means and the fuel pump means for enabling and maintaining of a flow of fuel to the turbine engine at a pressure independent of a pressure in the fuel storage means and in the turbine engine in response to operating parameters of the engine; and means for at least temporarily increasing a pressure to the pressurized fuel tank to initiate a flow of fuel from the fuel tank to the fuel pump means upon a start-up of the turbine engine.

26. A fuel control system according to claim 25, wherein said means for at least temporarily increasing a pressure includes a pressurized gas source means activated in response to a start command signal for the turbine engine.

27. A fuel control system according to claim 26, wherein means communicating with the fuel tank and the pressurized gas source means are provided for preventing an excess pressure from being supplied by the pressurized gas source means.

28. A fuel control system according to claim 27, wherein means are provided for maintaining a pressure in the fuel tank at least equal to a pressure of a combustor means of the gas turbine engine.

29. A fuel control system according to claim 28, wherein the fuel tank includes a flexible means disposed therein for separating the fuel and gas, and means ar provided for venting a gas side of the flexible means to the atmosphere.

30. A fuel control system according to claim 25, wherein the fuel pump means is directly driven by a turbine mean of the turbine engine.

31. A fuel control system for a turbine engine including a starter means responsive to a start command for a start-up of the engine, the fuel control system comprising:

fuel storage means for accommodating a fuel to be supplied to the turbine engine;

fuel pump means adapted to supply fuel from the fuel storage means to the turbine engine;

control means interposed between the fuel storage means and the fuel pump means for enabling and maintaining a flow of fuel to the turbine engine at a pressure independent of a pressure in the fuel storage means and in the turbine engine in response to operating parameters of the engine; and means for increasing a pressure in the fuel storage means so as to initiate a fuel flow upon activation of the starter means.

32. A fuel control system according to claim 31, wherein means are provided for maintaining a pressure in the fuel tank at least equal to a pressure of a combustor means of the gas turbine engine during operation thereof.

* * * * *